(12) United States Patent
Brockmann

(10) Patent No.: US 9,131,640 B2
(45) Date of Patent: Sep. 15, 2015

(54) FORAGE HARVESTERS CHOPPER DRUM BRAKING SYSTEM

(75) Inventor: Andreas Brockmann, Bidingen (DE)

(73) Assignee: AGCO International GmbH, Neuhausen (CH)

( * ) Notice: Subject to any disclaimer, the term of this patent is extended or adjusted under 35 U.S.C. 154(b) by 303 days.

(21) Appl. No.: 13/641,153

(22) PCT Filed: Apr. 11, 2011

(86) PCT No.: PCT/EP2011/055609
§ 371 (c)(1),
(2), (4) Date: Jun. 13, 2013

(87) PCT Pub. No.: WO2011/128286
PCT Pub. Date: Oct. 20, 2011

(65) Prior Publication Data
US 2013/0247527 A1    Sep. 26, 2013

(30) Foreign Application Priority Data

Apr. 15, 2010 (GB) .................................. 1006245.3

(51) Int. Cl.
| | | |
|---|---|---|
| A01D 69/10 | (2006.01) |
| A01D 75/18 | (2006.01) |
| A01D 43/08 | (2006.01) |
| A01F 29/16 | (2006.01) |

(52) U.S. Cl.
CPC ................ *A01D 75/18* (2013.01); *A01D 43/08* (2013.01); *A01D 43/085* (2013.01); *A01D 75/187* (2013.01); *A01F 29/16* (2013.01)

(58) Field of Classification Search
CPC ............ F16H 61/4157; F16H 61/4104; F16H 61/4043; F16H 61/42; F16H 61/46; A01D 75/187; A01D 43/08; A01F 29/16; A01F 29/14; Y10S 56/11; Y10S 56/15
USPC ........... 60/403, 648, 636, 490, 436, 444, 445, 60/468, 476, 489; 56/11.8, 10.2 J, 11.3; 460/3; 241/36
See application file for complete search history.

(56) References Cited

U.S. PATENT DOCUMENTS

| | | | | |
|---|---|---|---|---|
| 4,034,918 A | * | 7/1977 | Culbertson et al. | ............. 241/36 |
| 4,261,161 A | * | 4/1981 | Colgrove et al. | ................. 460/3 |
| 5,325,670 A | * | 7/1994 | Iino | ................................ 60/468 |
| 6,324,822 B1 | * | 12/2001 | Oliva | .......................... 56/10.2 J |

(Continued)

FOREIGN PATENT DOCUMENTS

| | | | | |
|---|---|---|---|---|
| DE | 102009002849 A1 | 1/2010 | | |
| EP | 1769992 A2 | * | 4/2007 | .............. B60T 13/26 |

OTHER PUBLICATIONS

International Search Report for International Application No. PCT/EP2011/055609 Dated Aug. 9, 2011.

*Primary Examiner* — Arpad Fabian-Kovacs

(57) ABSTRACT

A braking system for a rotating chopper drum (14) of a forage harvester (10) driven from an engine (11) via a drive train including a disengageable clutch (21). The drive train also drives a first pump (28) connected with the drum (14) which pumps fluid around a hydraulic circuit which includes an openable restriction (40). The system is arranged to brake the chopper drum (14) by disengaging the clutch (21) and arranging the first pump (28) to pump fluid around the circuit via the openable restriction (40) as the drum (14) continues to rotate to convert the energy of the rotating drum (14) into heat.

5 Claims, 3 Drawing Sheets

(56) References Cited

U.S. PATENT DOCUMENTS

| | | | |
|---|---|---|---|
| 6,397,570 B1 * | 6/2002 | Bohrer et al. | 56/10.2 J |
| 6,564,549 B2 * | 5/2003 | Nagura et al. | 60/436 |
| 7,721,515 B2 * | 5/2010 | Pollklas et al. | 56/10.2 J |
| 7,950,209 B2 * | 5/2011 | Rauschenbach et al. | 56/11.8 |
| 8,869,522 B2 * | 10/2014 | Bohrer et al. | 60/490 |
| 2003/0172638 A1 * | 9/2003 | Ameye et al. | 56/16.4 R |
| 2005/0050872 A1 | 3/2005 | Kempf | |
| 2006/0254235 A1 * | 11/2006 | Dueckinghaus et al. | 56/11.9 |
| 2007/0277491 A1 * | 12/2007 | Byttebier et al. | 56/10.2 J |

\* cited by examiner

FORAGE HARVESTERS CHOPPER DRUM BRAKING SYSTEM

BACKGROUND OF THE INVENTION

1. Field of Invention

This invention relates to self propelled forage harvesters and in particular to a system for braking a chopper drum of a forage harvester when the chopper drum drive is turned off.

2. Description of Related Art

Due to the large inertia and high speed of rotation of such chopper drums it can often take 50 seconds or more for the drum to come to rest when the drum drive is turned off and this is dangerous and carries a significant risk of injury.

OVERVIEW OF THE INVENTION

It is an objective of the present invention to at least reduce the above problem.

Thus in accordance with the present invention there is provided a braking system for a rotating chopper drum of a forage harvester driven from an engine via a drive train including a disengageable clutch, the drive train also driving a first pump connected with the drum which pumps fluid around a hydraulic circuit which includes an openable restriction and a motor driven by the first pump, the motor driving feed rolls of the forage harvester which feed crop to the chopper drum, the system being arranged to brake the chopper drum by disengaging the clutch and arranging the first pump to pump fluid around the circuit via the openable restriction as the drum continues to rotate to convert the energy of the rotating drum into heat, so that when the clutch is disengaged the supply of fluid from the first pump to the feed roll motor is disconnected and the fluid pumped round the circuit by the first pump is diverted through the openable restriction.

It has been found that by using the above braking arrangement the time to brake the drum to rest can be significantly reduced from approaching one minute to less than ten seconds.

In a preferred arrangement the openable restriction comprises a pressure relief valve.

Conveniently the supply of fluid from the first pump to the feed roll motor is disconnected by a solenoid operated two-position dump valve which directs fluid flow from the first pump to a system sump via a restrictor and thus operates a pilot-operated diverter valve to divert the main flow from the first pump through the openable restriction.

When the clutch is disconnected the charge pressure level of the first pump, typically 25 bar, will drop below 25 bar once the rotational speed of the first pump has dropped below 500 r.p.m. In order to maintain a charge pressure level of 25 bar for the first pump at pump speeds of below 500 r.p.m. a second pump driven from the engine can be used.

Conveniently the second pump charge pressure is connected with the first pump charge pressure via a solenoid operated valve.

The system may also include a quick-stop function for the feed roll motor, the quick-stop function including a foreign body detecting device for detecting a foreign body moving in the feed rolls towards the chopper drum, a control unit which when it receives a signal from the detecting device issues a signal to open a second solenoid operated dump valve to open up a connection between the supply side of the first pump and the circuit sump via a second restrictor, reduced pressure on the sump side of the second restrictor then pilot-operating a bypass valve to divert the main supply of fluid from the first pump to a return line of the first pump and also pilot-operating a brake valve which closes the flow of fluid from the feed roll motor down the return line back to the first pump to brake the rotation of the feed roll motor.

The first pump may be driven in reverse to drive the feed rolls backwards and allow the removal of a foreign body from within the feed rolls.

BRIEF DESCRIPTION OF THE DRAWINGS

The present invention will now be described, by way of example only, with reference to the accompanying drawings in which.

DETAILED DESCRIPTION OF THE INVENTION

Figure 1:
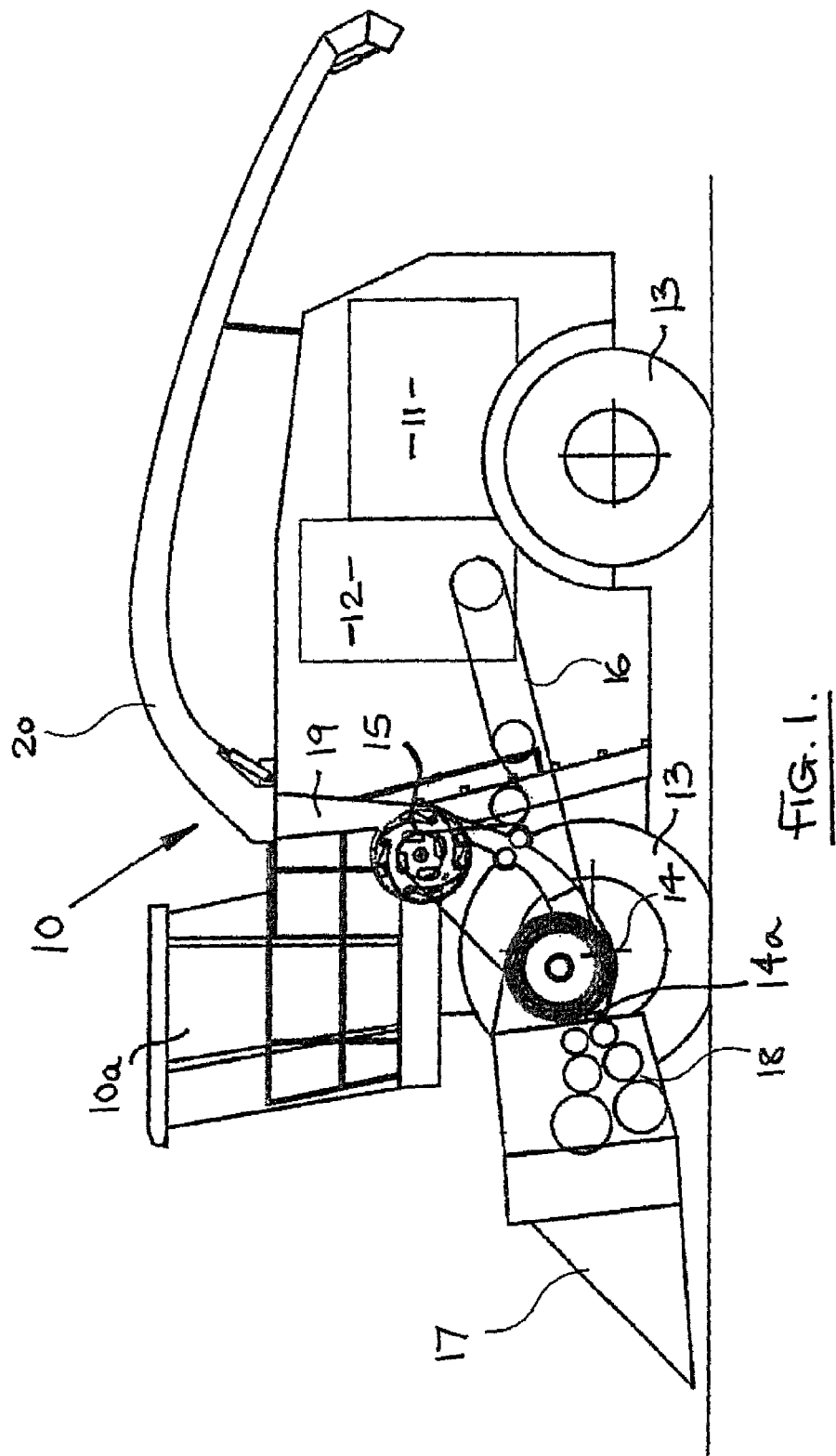
FIG. 1 shows diagrammatically the layout of a forage harvester which includes a chopper drum braking system in accordance with the present invention.
Figure 2:
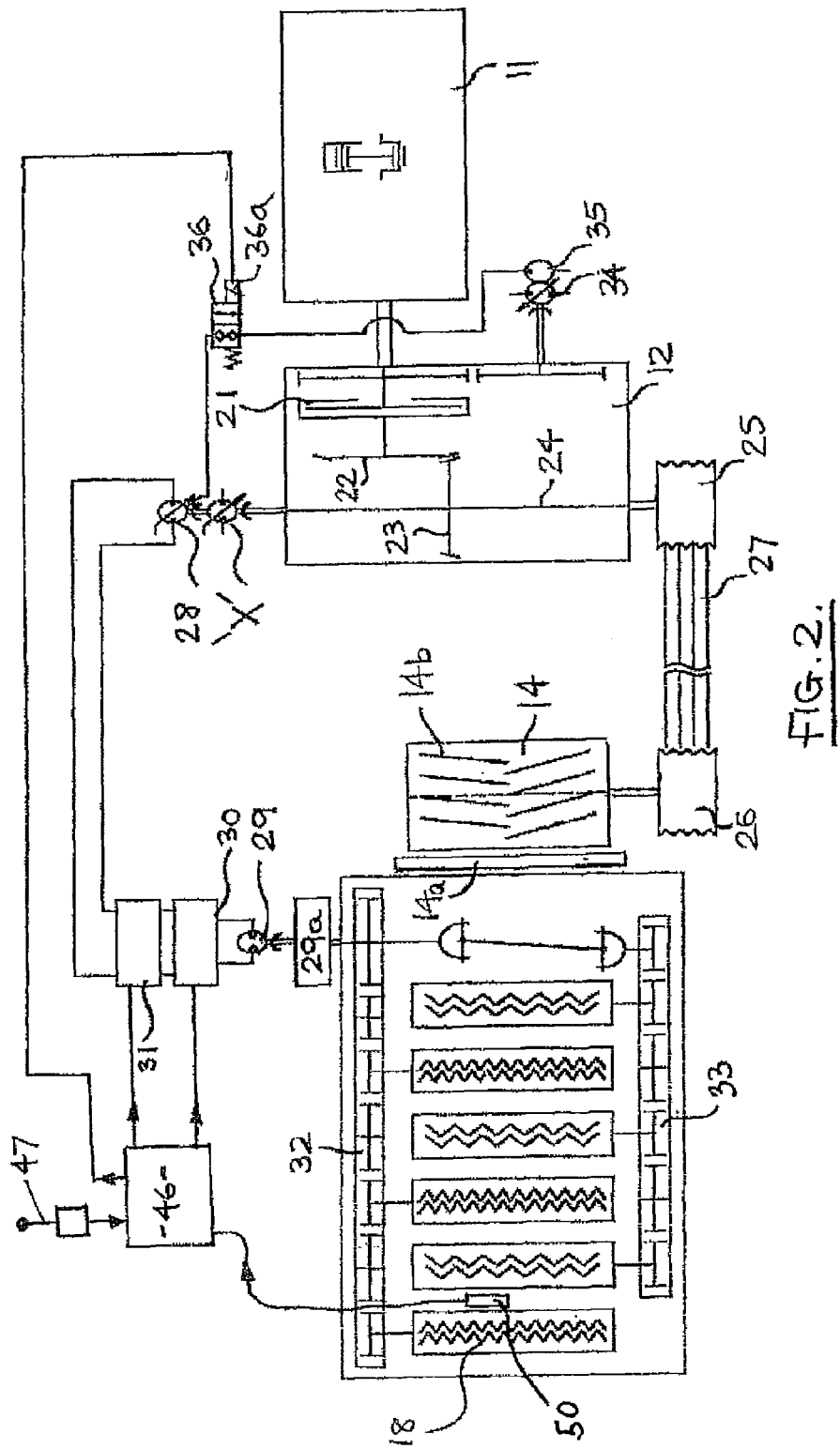
FIG. 2 shows diagrammatically the drive line for the chopper drum and feed rolls of the forage harvester of FIG. 1.
Figure 3:
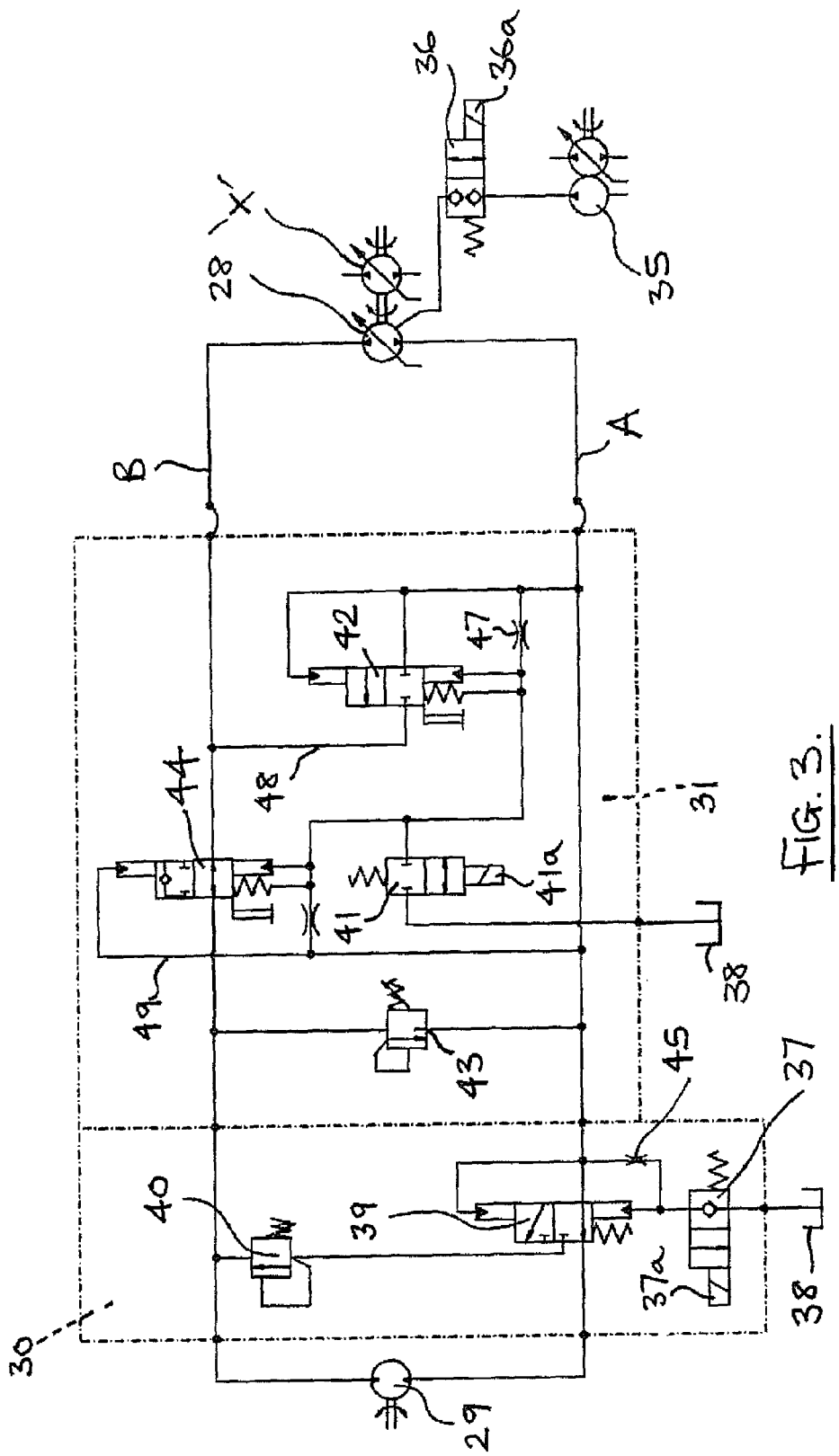
FIG. 3 shows the hydraulic supply circuit which powers the feed rolls and operates the chopper drum brake.

Referring to the drawings, FIG. 1 shows a forage harvester 10 having a cab 10a and an engine 11 which powers a gearbox 12 from which wheels 13 of the harvester are driven via a hydraulic pump and hydraulic motor closed circuit shown in FIGS. 2 and 3. Gearbox 12 also drives a chopper drum 14 and discharge fan 15 via a belt drive 16. Crop is fed to the chopper drum 14 via a conventional header 17 and feed rolls 18 which are driven by the drive arrangement shown in FIG. 2. The chopper drum has circumferentially spaced blades 14b which cooperate with a fixed cutter bar 14a to cut the crop into short lengths of harvested material.

After the crop is processed by the chopper drum 14 and the associated cutter bar 14a it passes down a discharge chute 19 powered by the fan 15 and into a conventional rotatable discharge spout 20 which feeds the crop into a trailer or other vehicle moving alongside the forage harvester.

The FIG. 2 shows the drive train for the chopper drum 14 and the feed rolls 18. Engine 11 drives the chopper drum 14 via a disengageable clutch 21, bevel gears 22 and 23, drive shaft 24 and pulleys 25 and 26 which are connected by a drive belt 27. The drive from engine 11 to chopper drum 14 is thus completely mechanical, but could use a hydraulic link if desired.

The feed rolls 18 are driven by a first variable displacement hydraulic pump 28 driven from shaft 24 which powers a fixed displacement motor 29 via a chopper drum brake control circuit 30 and a feed roll quick-stop control circuit 31. These circuits are shown in greater detail in FIG. 3. Motor 29 powers feed rolls 18 via a two speed gearbox 29a and gear trains 32 and 33 respectively.

As is well known, by varying the speed of rotation of feed rolls 18 which in turn varies the speed at which the crop is fed towards the chopper drum which rotates at a substantially constant speed, the length of the chopped crop can be varied. The faster the speed of rotation of the feed rolls the longer the length of the chopped crop.

The combination of the variable displacement pump 28, fixed displacement motor 29 and gearbox 29a allows the speed of rotation of feed rolls 18 to be varied sufficient so that, for example, when harvesting maize a crop length of between 4 mms and 10 mms can be obtained and when harvesting grass a chopped crop length of up to 20 mms can be obtained.

Pumps 34 and 35 are also provided which are driven mechanically from engine 11 via gearbox 12. Pump 34 is connected with hydraulic traction motors (not shown) associated with the wheels of the forage harvester in order to drive the forage harvester over the ground. Pump 35 is a charge pump which can be connected to with the charge circuit of the first pump 28 via a two-position solenoid-operated valve 36 when required. Pump 35 maintains the charge pressure of pump 28 when connected to the charge circuit of pump 28 via valve 36. A further pump 50, which is also driven from shaft 24, powers the header 17.

Referring to FIG. 3, the chopper drum brake control circuit 30 includes a solenoid-operated dump valve 37 which is normally closed but when open dumps hydraulic pressure from line A of the circuit of FIG. 3 to the sump 38 of the circuit. The chopper drum brake circuit 30 also includes a two-position pilot operated valve 39 and a pressure relief valve 40.

The feed roll quick-stop circuit 31 includes a second solenoid-operated dump valve 41 which when open discharges fluid into the circuit sump 38 and a two-position pilot operated (and also manually operable) diverter valve 42 connected between the output line A and the return line B of pump 28. A further pressure control valve 43 also connects the line A and B and a pilot operated two-position brake valve 44 is provided in return line B. This brake valve 44 either allows flow through line B in both directions or only allows flow from pump 28 down line B when the feed rollers are being operated in reverse.

In accordance with the present invention, the chopper drum brake control function operates as follows.

When the forage harvester operator decides to disconnect drive to the chopper drum 14 he operates the appropriate control provided in the forage harvester cab 10a and this disconnects clutch 21 and also actuates the solenoid 37a of solenoid operated dump valve 37 to connect the supply line A with the system sump 38 and actuates solenoid 36a of the two position valve 36 to connect charge pump 35 with the charge circuit of pump 28 to ensure that the charge pressure of pump 28 is maintained at around 25 bar as the speed of pump 28 falls. Due to the presence of restrictor 45, the pressure on the sump side of restrictor 45 falls to sump level which operates the pilot operated valve 39 to disconnect line A from motor 29 and connects line A to line B via the pressure relief valve 40. Disconnection of line A from motor 29 via valve 39 disconnects drive to the feed rolls 18 which is an important safety feature of the present invention since it ensures that the feed rolls cannot restart due to any continued operation of pump 28.

With clutch 21 disconnected pump 28 continues to pump fluid through the pressure relief valve 40 (which is set at a level of approximately 200 bar) converting the energy from the rotating chopper drum 14 and connected pump 28 into heat as the fluid within the circuit of FIG. 3 is pumped through the pressure relief valve 40 and back to the pump 28 via return line B.

This produces a high level of braking on the chopper drum 14 which is connected with the pump 28 via shaft 24 and thus the time to brake the rotation of the chopper drum to rest is dramatically reduced from times approximating to one minute to times of 10 seconds or less.

As will be appreciated, in the example described, the operation of the feed roll quick-stop circuit 31 is intimately connected with the operation of the chopper drum brake control circuit 30 since these two circuits are interconnected for convenience. It will be understood that a particular forage harvester could have circuit 30 without circuit 31 or could have circuit 31 without circuit 30.

A foreign body detector 50 is provided adjacent to the feed rolls 18 to detect metal or other foreign bodies which have entered the feed rolls and which will potentially seriously damage the chopper drum were they to reach the drum and associated cutter bar 14a. This detector 50 is connected with an overall control system 46 which controls the operation of chopper drum control circuit 30 and feed roll quick-stop circuit 31 together with solenoid-operated valve 36 as shown diagrammatically in FIG. 2. Overall control system 46 also receives command inputs from the operator by one or more input devices shown diagrammatically in FIG. 2 at 47.

Thus, when the detector 50 provides a signal to overall control system 46, indicating that a foreign body has entered the feed rolls 18, the control 46 operates the solenoid 41a of dump valve 41 to connect supply line A with the sump 38 via restrictor 47. The pressure on the sump side of restrictor 47 falls to sump level which operates pilot operated valve 42 to divert flow from line A to line B via connection 48. Also the higher level of pressure in line 49 operates pilot operated brake valve 44 to cut off the flow of fluid in line B towards pump 28 and thus maintain the high pressure in return line B between motor 29 and pilot operated brake valve 44 against which the motor connected with feed rolls 18 attempts to rotate. This produces a rapid braking effect on motor 29 which in turn rapidly stops the rotation of the feed rolls 18 before the foreign body can reach the chopper drum 14.

As indicated above, the feed rolls 18 can be driven in reverse to dislodge foreign bodies from within the feed rolls by reversing pump 28 so that line B becomes the supply line to motor 29 and the line A the return line to pump 28. When operating in reverse there is no need for chopper drum brake circuit 30 or quick-stop control circuit 31 to be operative.

Thus the present invention provides a chopper drum braking circuit 30 which can significantly reduce the time to bring the chopper drum to a halt by arranging the pump 28, which normally drives the feed rolls 18 but is connected with the chopper drum 14, to pump fluid at a high pressure through pressure relief valve 40 to convert the energy of the rotating chopper drum into heat.

An interconnected quick-stop feed roll control circuit is also provided.

It will be appreciated that the pump 28 can be arranged to pump fluid through some other form of openable restriction in place of the pressure relief valve 40. For example, the pressure relief valves which are typically installed in the closed circuit pump 28 can be used. Alternatively pressure relief valve 40 could be replaced with a fixed orifice, a variable orifice, a flow control valve, or an electronically adjustable pressure relief valve. As a further alternative, a hydraulic accumulator could be used to store the fluid instead of dumping the fluid to sump 38 so that the hydraulic energy stored in the accumulator can be reused.

Also, the drum braking circuit 30 can be used without the quick-stop circuit 31 and the two circuits can be designed independently and located at different positions on the forage harvester.

The invention claimed is:

1. A forage harvester having a rotating chopper drum and a braking system for the rotating chopper drum, the chopper drum driven from an engine via a drive train, said braking system comprising a clutch having an engaged condition in which the engine rotates the chopper drum and a disengaged condition in which the clutch disengages the chopper drum from the engine and a first pump connected with the chopper drum which pumps fluid around a hydraulic circuit, wherein the hydraulic circuit comprises an openable pressure relief valve and a feed roll motor driven by the first pump, the motor driving feed rolls of the forage harvester which feed crop to the chopper drum, and wherein when the clutch is in the disengaged condition, the first pump pumps fluid around the circuit via the openable pressure relief valve and back to the first pump via a return line, wherein when the clutch is disengaged the supply of fluid from the first pump to the feed roll motor is disconnected by a solenoid operated two-position dump valve which directs fluid flow from the first pump to a system sump via a restrictor and operating a pilot-operated diverter valve to divert the main flow from the first pump through the openable pressure relief valve.

2. A forage harvester according to claim 1 in which when the clutch is disconnected a charge pressure level of the first pump is maintained by the charge pressure of a second pump driven from the engine.

3. A forage harvester according to claim 2 in which the second pump charge pressure is connected with the first pump charge pressure via a solenoid operated valve.

4. A forage harvester according to claim 1 which includes a quick-stop function for the feed roll motor, the quick-stop function including a foreign body detecting device for detecting a foreign body moving in the feed rolls towards the chopper drum, a control unit which when it receives a signal from the detecting device issues a signal to open a second solenoid operated clump valve to open up a connection between the supply side A of the first pump and the circuit sump via a second restrictor, reduced pressure on the sump side of the second restrictor then pilot-operating a bypass valve to divert the main supply of fluid from the first pump to the return line of the first pump and also pilot-operating a brake valve which closes the flow of fluid from the feed roll motor down the return line back to the first pump to brake the rotation of the feed roll motor.

5. A forage harvester according to claim 4 in which the first pump can be driven in reverse to drive the feed rolls backwards and allow the removal of a foreign body from within the feed rolls.

* * * * *